(12) United States Patent
Christof (10) Patent No.: US 10,086,941 B2
(45) Date of Patent: Oct. 2, 2018

(54) MULTIFUNCTIONAL POD FOR AN AIRCRAFT

(71) Applicant: Airbus Defence and Space GmbH, Ottobrunn (DE)

(72) Inventor: Horst Christof, Aying (DE)

(73) Assignee: Airbus Defence and Space GmbH (DE)

(*) Notice: Subject to any disclaimer, the term of this patent is extended or adjusted under 35 U.S.C. 154(b) by 67 days.

(21) Appl. No.: 15/082,219

(22) Filed: Mar. 28, 2016

(65) Prior Publication Data

US 2016/0288906 A1 Oct. 6, 2016

(30) Foreign Application Priority Data

Mar. 31, 2015 (DE) .................. 10 2015 004 111

(51) Int. Cl.
| | |
|---|---|
| *B64D 1/08* | (2006.01) |
| *B64D 1/04* | (2006.01) |
| *B64D 7/00* | (2006.01) |
| *B64D 37/12* | (2006.01) |
| *F41F 3/06* | (2006.01) |
| *F41F 3/052* | (2006.01) |
| *F41F 3/065* | (2006.01) |
| *F41F 5/00* | (2006.01) |

(52) U.S. Cl.
CPC .............. *B64D 1/08* (2013.01); *B64D 1/04* (2013.01); *B64D 7/00* (2013.01); *B64D 37/12* (2013.01); *F41F 3/06* (2013.01); *F41F 3/052* (2013.01); *F41F 3/065* (2013.01); *F41F 5/00* (2013.01)

(58) Field of Classification Search
CPC ... B64D 1/08; B64D 1/04; B64D 7/00; B64D 37/12; F41F 3/06; F41F 3/052; F41F 3/065; F41F 5/00
See application file for complete search history.

(56) References Cited

U.S. PATENT DOCUMENTS

| | | | | |
|---|---|---|---|---|
| 2,731,885 A | * | 1/1956 | Nolan | B64D 1/06 89/1.806 |
| 2,816,483 A | * | 12/1957 | Johnston | B64D 1/04 89/1.817 |
| 3,009,730 A | * | 11/1961 | Gantschnigg | B64D 1/04 294/82.26 |
| 8,205,536 B2 | * | 6/2012 | Fisher | B64D 1/04 89/1.11 |

(Continued)

FOREIGN PATENT DOCUMENTS

| | | |
|---|---|---|
| AT | 253 364 B | 4/1967 |
| AT | 253364 * | 1/2001 |

(Continued)

OTHER PUBLICATIONS

DE 10 2015 004 111.8—Office Action dated Mar. 11, 2016.

*Primary Examiner* — Justin M Benedik
(74) *Attorney, Agent, or Firm* — Lerner, David, Littenberg, Krumholz & Mentlik, LLP (57) ABSTRACT

A multifunctional pod for an aircraft has at least two separate regions. At least one first region of the pod is provided for receiving fuel. A second region of the pod includes at least one receiving device for releasably attaching at least one additional load. The additional load can be releasably attached to the receiving device via a loading opening on the side of the pod facing away from the aircraft.

13 Claims, 7 Drawing Sheets

(56) References Cited

U.S. PATENT DOCUMENTS

2005/0204910 A1* 9/2005 Padan .................. B64D 1/04
                                                  89/1.813

FOREIGN PATENT DOCUMENTS

| CH | 431 287 A | 2/1967 |
| GB | 754 429 A | 8/1956 |
| GB | 777 919 A | 6/1957 |
| GB | 780 722 A | 8/1957 |
| WO | 2013/121031 A2 | 8/2013 |

* cited by examiner

MULTIFUNCTIONAL POD FOR AN AIRCRAFT

FIELD OF THE INVENTION

Various embodiments generally relate to a multifunctional pod for an aircraft.

BACKGROUND OF THE INVENTION

Modern aircraft, in particular fighter aircraft, generally only comprise a limited number of external load supports for attaching weapons or tank containers, known as pods. In order to increase the range of a fighter aircraft, for example additional tank containers, known as drop tanks, are required. When drop tanks are used, only a reduced number of external load supports are therefore available for loading the aircraft with other loads, such as weapons. The aircraft can thus transport fewer loads, or the range of the aircraft is limited to the range that would be achieved by utilising the tank container arranged in the aircraft itself.

BRIEF SUMMARY OF THE INVENTION

One of the ideas of the invention is to provide an improved pod for an aircraft which avoids at least some of the drawbacks in the prior art.

A multifunctional pod for an aircraft is provided. The multifunctional pod comprises at least two separate regions. At least one first region of the pod is provided for receiving fuel. A second region of the pod comprises at least one receiving device for releasably attaching at least one additional load. The additional load can be releasably attached to the receiving device via a loading opening on the side of the pod facing away from the aircraft.

A basic concept of the invention is to provide a multifunctional pod for an aircraft which has both a region for receiving fuel and at least one second or additional region for releasably attaching an additional load. The multifunctional pod (also just referred to as a pod) thus has several functions, on one hand the function of an external tank container and on the other hand of a receiving container for additional, releasably attached loads. This increases the quantity of fuel available to the aircraft. At the same time, the number of available external load supports is maintained or even increased by the receiving device available in the pod.

A multifunctional pod or a pod is understood to be a receiving container which can be releasably fastened to an aircraft, for example to the underside of the fuselage or the underside of the aerofoils. Such pods are, for example, fastened to external load supports of the aircraft and can be released from the aircraft during flight. When said pods are used as containers for receiving fuel, they are also referred to as drop tanks, for example.

The pod comprises a loading opening on the side facing away from the aircraft. "Facing away from the aircraft" means the side which, when attaching the pod to the underside of the fuselage or aerofoil, is facing away from the aircraft, in this case therefore on the underside of the pod. When attaching the pod for example to the top of the aerofoil, the loading opening on the side facing away from the aircraft may, for example, thus also be on the top of the pod in a normal position of the aircraft. For example, when the aircraft rolls during flight, the loading opening may then be oriented downwards, for example for releasing a load attached in the second region, so that the load can be released.

In some embodiments, different types of loads can be releasably attached in the second region in various ways by means of the receiving device. Different types and numbers of loads can be releasably attached in the second region of the pod by means of the receiving device. For example, at least one external load support or comparable load support or support may be attached to the receiving device. Alternatively, a plurality of, for example two or more, external load supports or comparable load supports for receiving a plurality of additional loads may also be arranged in parallel and/or in series in the second region. This is advantageous in that the pod can be used for different types and numbers of loads.

In some embodiments, the additional load is at least one container for receiving fuel. In order to further increase the range of the aircraft, a container for receiving fuel may for example be attached in the second region. This is advantageous in that the range of the aircraft can be significantly increased by the fuel from the first region and the fuel from the second region of the pod.

In some embodiments, the receiving device comprises an adapter for transferring fuel from the container to the aircraft or for filling the container with fuel from the aircraft by means of an external refuelling device. The receiving device may for example be provided with an external load support which comprises an adapter, by means of which a fuel connection can be established between the tank container and the aircraft. This is advantageous in that fuel can be conveyed from the pod to the aircraft or, vice versa, from the aircraft, for example during in-flight refuelling, into the pod by means of the adapter.

In some embodiments, the additional load is at least one rocket or at least one bomb. A "rocket" means a guided missile, for example. Here, the rockets may for example be self-homing rockets (fire and forget rockets), remote-controlled guided missiles or semi-automatic guided missiles. A "bomb" for example means an unguided or dumb bomb, or what is known as a precision-guided bomb (a smart bomb). Preferably, the rockets are designed such that, after being released from the pod, they fall for a short distance, preferably at least far enough that they have left the load region of the pod, and are only fired after they have left the pod and are flying towards the target. This is advantageous in that the additional rockets or bombs can increase the defence and/or attack abilities of the aircraft. Furthermore, accommodating rockets or bombs in the pod is advantageous in that it cannot be seen from the outside whether and how the aircraft is armed, or by how much the range has been increased.

In some embodiments, the receiving device comprises at least one release device for one or more rockets. By means of the at least one release device, for example a Heavy Duty Ejector Release Unit (HDERU) or a comparable retaining device, one or more rockets can be releasably mounted, which for example can be released when the target area is reached. This is advantageous in that, in addition to the transported fuel, the pod can also carry at least one rocket in order to increase the defence and/or attack abilities of the aircraft. The at least one release device can preferably be attached to the receiving device in various ways. This is advantageous in that the position of the release device, for example, can be changed in the longitudinal direction or transverse direction of the pod according to the particular load to be attached or to the number of loads.

In some embodiments, the receiving device comprises at least one release device for one or more bombs. By means of the at least one release device, for example a heavy duty ejector release unit (HDERU), one or more bombs can be releasably mounted, which for example can be released when the target area is reached. This is advantageous in that, in addition to the transported fuel, the pod can also carry at least one bomb in order to increase the defence and/or attack abilities of the aircraft. The at least one release device or retaining device can preferably be attached to the receiving device in various ways. This is advantageous in that the position of the release device and/or the number of release devices can be changed in the longitudinal direction or transverse direction of the pod according to the particular load to be attached or to the number of loads or bombs.

In some embodiments, the receiving device comprises at least one adapter for controlling the release of the rockets or bombs by means of the aircraft. In order to release the rocket(s) and/or bomb(s) in the vicinity of the target area as required, for example, the receiving device comprises at least one adapter which is preferably connected to a release device in the cockpit of the aircraft, for example, and by means of which signals can be transmitted to the release device and by which signals can be transmitted to the cockpit, for example. A signal can for example be transmitted to the release device by means of the adapter so that the release device releases a rocket or a bomb. This is advantageous in that, by means of the adapter, for example additional information, for example target coordinates, can be transmitted for example from the cockpit to an self-homing rocket or a precision-guided bomb, or status information relating to the rocket or bomb can be transmitted to a computer on-board the aircraft or to the cockpit.

In some embodiments, a plurality of rockets and/or bombs can be releasably attached to the receiving device in parallel and/or in succession. For example, a plurality of release devices, for example HDERUs, may be arranged on the receiving device. In this case, for example two or more HDERUs may be arranged in series, i.e. in succession in the longitudinal direction of the pod, within the load region. Furthermore, for example two or more HDERUs may be arranged beside one another on the receiving device. For example, two HDERUs may also be arranged in parallel for receiving two smaller rockets or bombs, for example, and a separate HDERU for receiving a larger rocket or bomb may also be arranged in series therewith. This is advantageous in that almost any rockets or bombs or combinations of rockets and/or bombs can be releasably attached in the load region of the pod by means of a receiving device that has an almost unlimited level of variability for attaching the release devices. The number or arrangement is only limited by the size of the load region of the pod.

In some embodiments, the additional load is at least one sensor device. For example, the additional load is a sensor device for reconnoitering and/or monitoring a flight area or a territory. Alternatively, the additional load may also be a communication module, for example for the aircraft to communicate with other aircraft. Furthermore, the sensor device may also comprise a communication device. This is advantageous in that, in addition to conveying fuel, the aircraft may have additional abilities on account of the pod, for example for reconnaissance and/or monitoring. Furthermore, this is advantageous in that from the outside it cannot be seen, or it is very difficult to see, whether or not a flight mission is being carried out using a sensor.

In some embodiments, the receiving device comprises at least one adapter for the aircraft to communicate with the sensor apparatus. In order to exchange data with the sensor device, i.e. from the aircraft to the sensor device or from the sensor device to the aircraft, the receiving device comprises an adapter which can be connected or coupled to the sensor device. The adapter may for example allow wired and/or wireless data exchange between the sensor device and the aircraft. In a wired embodiment, for example the receiving device is provided with a socket, to which a plug of a cable that is connected to the sensor device can be coupled. The socket of the receiving device is for example connected to the aircraft by means of an additional wired and/or wireless connection, for example. This is advantageous in that, in addition to conveying fuel and "dumb" loads, loads which have a data exchange to or with the aircraft can also be transported by means of the pod.

In some embodiments, the pod comprises at least one additional region for receiving fuel. The pod preferably comprises, in addition to the first region for transporting fuel, at least one or even a plurality of additional regions in which fuel can be received. This is advantageous in that the quantity of fuel carried in the pod is increased.

In some embodiments, the regions of the pod for receiving fuel are arranged in the front and rear region of the pod. For example, the front and the rear region of the pod are provided as a fuel region. The front and the rear region of a pod have a conically tapering shape, for example for aerodynamic reasons, the intermediate region having an outer contour that is as constant as possible at least in part or for the most part. In order to receive an additional load in the load region, it may be advantageous for the load region to be provided in the region having an outer contour that is as constant as possible, for example. In order to best utilise the pod, the region having a tapering shape or having a non-constant outer shape is provided for receiving fuel, since the shape of the pod in the region for receiving fuel is virtually irrelevant. In order to receive additional loads, a load region having a constant shape is advantageous. This is advantageous in that, as a result, almost the entire load region can be used in various ways for receiving loads. This is also advantageous in that, in addition to conveying one or more additional loads, the available volume of the pod for additionally receiving fuel can be utilised as optimally as possible. Furthermore, this is advantageous in that the outer geometry of the pod is always the same irrespective of the load in the load region of the pod. This also makes it easier to regulate the aircraft by means of the flight control system of the aircraft.

In order to achieve load distribution of the pod that is as constant as possible, the regions for receiving fuel may be distributed such that they are as neutral as possible with respect to the centre of gravity. In order to achieve centre-of-gravity distribution that is as optimal as possible, the regions for receiving fuel in the front region and in the rear region of the pod may also be equal in size as far as possible, for example. This is advantageous in that the pod is also balanced as far as possible when fuel is evenly received or withdrawn during flight. Transferring fuel by pumping for the purpose of load compensation can thus be prevented, at least within the pod itself. For load compensation of the entire aircraft, it may however be advantageous for it to be possible to internally and externally pump fuel between the available tank containers. For example, fuel may also be pumped out of the aircraft's own tank and into the tank region of the pod for load compensation, or vice versa.

The region for receiving the additional load may in some embodiments be arranged between the regions for receiving fuel. For example, the region for receiving the fuel is divided into two or more sub-regions or segments. The region for receiving the additional load is for example arranged between the regions for the fuel at least in part. For example, the front and the rear region of the pod are provided in the form of a fuel region and an intermediate region is provided in the form of a load region for receiving an additional load. Here, the regions for the fuel may also extend into the load region at least in part. This is advantageous in that the available volume of the pod can be optimally utilised.

In some embodiments, the regions for receiving fuel, on the side of the pod facing the aircraft, extend into the second region at least in part. The multifunctional pod may comprise additional regions for receiving fuel in the region of the receiving device, for example. These additional tank regions are arranged above the second region, i.e. the load region, for example. The load region can be loaded on the underside through the loading opening. The first region for receiving fuel is for example directly connected to the additional region for receiving fuel. For example, the first region may extend over the additional region in a manner so as to provide a shared tank container. Alternatively, two separate tank regions may be provided, one of the two being provided in the form of an actual tank container or main tank, and the other being provided in the form of a compensation tank or intermediate tank. This is advantageous in that the available volume of the pod can be optimally utilised. Here, the fuel can for example be pumped out of the actual tank container and into the aircraft via the compensation or intermediate tank, i.e. a pump is arranged in the tank container which pumps or sucks the fuel out of the pod and into the aircraft, i.e. a pump is arranged in the aircraft which conveys the fuel out of the pod and into the aircraft.

In some embodiments, the loading opening can be closed by means of at least one closure device. The closure device may for example comprise one or more symmetrical or asymmetrical flaps, shutters or the like. To actuate the closure device, a corresponding mechanism may in some embodiments be provided which for example can open and close the flaps as required. The closure device closes the loading opening against the outside. In some embodiments, the closure device is aerodynamically matched to the outer contour of the pod in the region of the loading opening. In order to attach the additional load or several loads in the load region via the loading opening, the closure device is opened. During flight, the loading opening is closed most of the time by the closure device. In order to release loads during flight, the closure device can be opened during flight and the loading opening can be uncovered. This is advantageous in that the pod has an outer contour that is as aerodynamically favourable as possible in the load region. Furthermore, the aerodynamic casing optimises the aerodynamics of the aircraft, as a result of which it is possible to increase the range of the aircraft while the load remains the same. In addition, the stealth properties of the aircraft are improved by using the pod while the load remains the same.

BRIEF DESCRIPTION OF THE DRAWINGS

In the drawings, the same reference numerals generally denote the same components across the various views. The drawings are not necessarily shown to scale; importance is instead generally attached to illustrating the principles of the invention. In the following description, various embodiments of the invention are described with reference to the following drawings, in which.

DETAILED DESCRIPTION

The following detailed description refers to the accompanying drawings, which, by way of explanation, show specific details and embodiments using which the invention can be implemented.

The word "exemplary" is used herein with the meaning of "serving as an example, occurrence or demonstration". Any embodiment or configuration that is described herein as "exemplary" should not necessarily be interpreted as preferred or advantageous compared with other embodiments or configurations.

In the following detailed description, reference is made to the accompanying drawings which form part of this description and in which specific embodiments are demonstrated by way of illustration using which the invention can be carried out. In this regard, directional terminology such as "above", "below", "front", "rear", etc. is used with reference to the orientation of the described figure(s). Since components in embodiments can be positioned in a number of different orientations, the directional terminology serves as illustration and is in no way limiting. It is understood that other embodiments can be used and structural or logical modifications can be made without departing from the scope of protection of the present invention. It is understood that the features of the various exemplary embodiments described herein can be combined with one another, unless specifically stated otherwise. The following detailed description should therefore not be understood in a limiting sense, and the scope of protection of the present invention is specified by the accompanying claims.

In the context of this description, the terms "connected", "attached" and "coupled" are used to describe both a direct and an indirect connection, a direct or indirect attachment and a direct or indirect coupling. In the drawings, identical or similar elements are provided with identical reference numerals, provided that this is expedient.

Figure 1A:
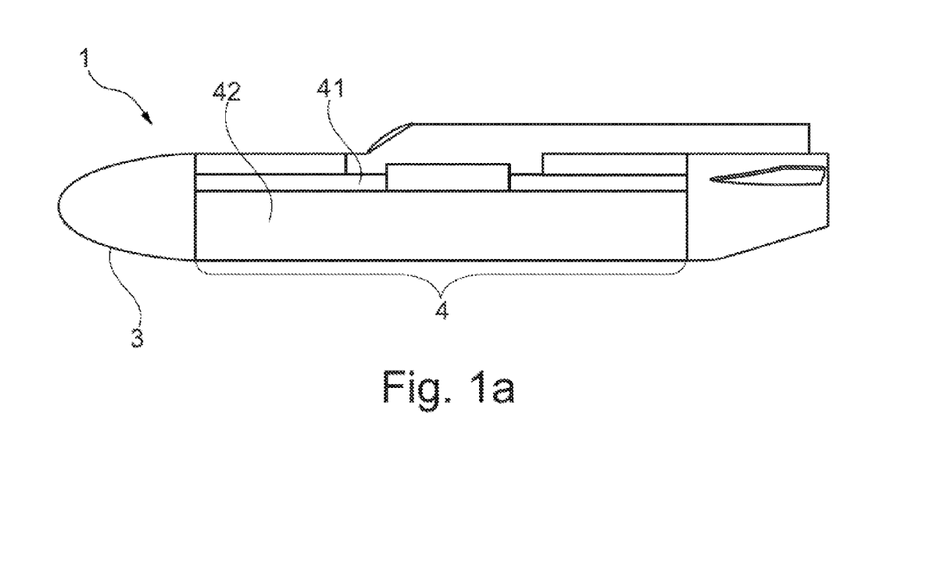
FIGS. 1a and 1b show different views of an embodiment of the multifunctional pod.
Figure 1B:
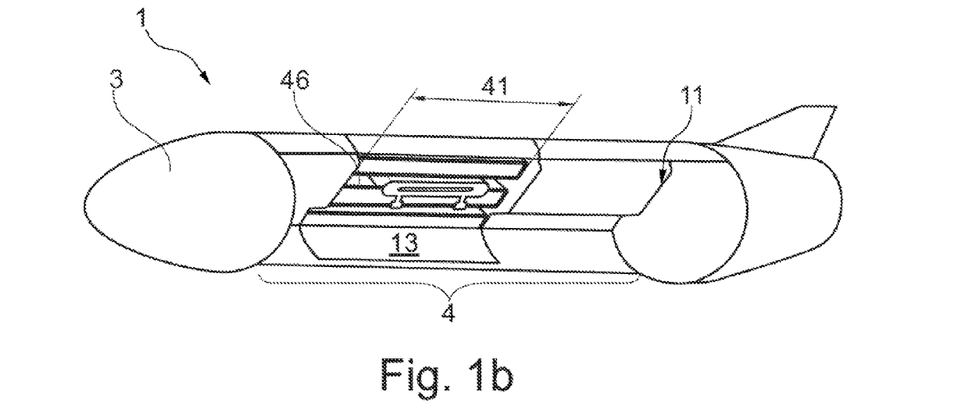

FIGS. 1a and 1b show different views of a first embodiment of the multifunctional pod 1. Here, FIG. 1a is a sectional view of a multifunctional pod and FIG. 1b is a three-dimensional view of said pod.

Figure 3A:
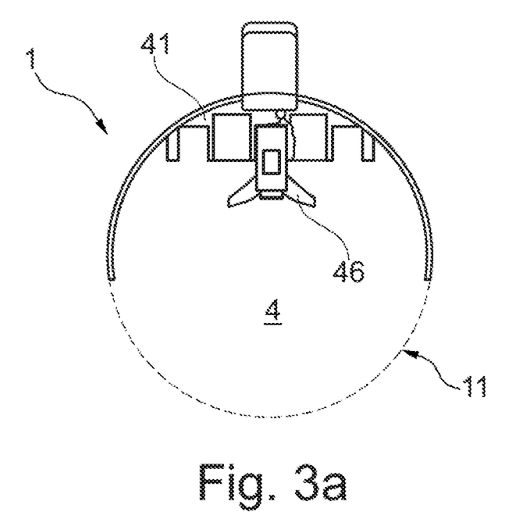
FIGS. 3a and 3b show different embodiments of the positioning of release devices.
Figure 3B:
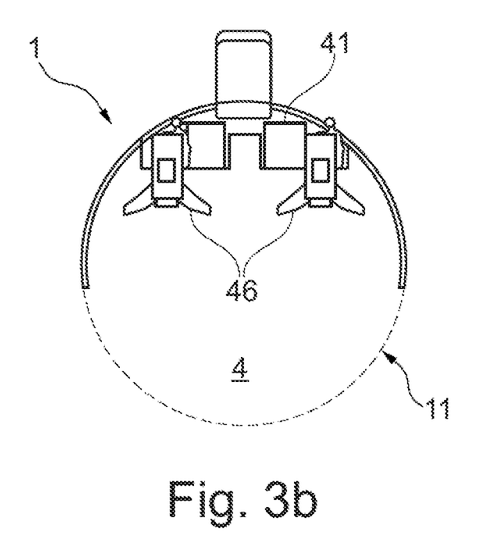

In the embodiment shown, the multifunctional pod 1 comprises a first region 3 for receiving fuel and an additional region 4 for receiving an additional load 42. The additional region 4 acts as a load region for receiving various types of load. The additional load 42 can be inserted into the load region 4 through a loading opening 11 on the underside, i.e. on the side of the pod 1 facing away from the aircraft. The additional load 42 can be fastened to a receiving device 41 in various ways in the load region 4. As shown in FIG. 1b, the receiving device 41 extends over a portion of the load region 4 on the upper wall portion of the pod 1 facing the aircraft. In another embodiment of the pod 1, which is not shown, the receiving device 41 may also extend over the entire length of the load region 4. In order to releasably fasten the additional load 42 to the receiving device 41, one or more release devices or retaining devices, such as a heavy duty ejector release unit (HDERU), may for example be attached to the receiving device 41 in various ways. In the embodiment shown, the receiving device 41 comprises a plurality of slots or guides/rails that are side by side, in which release devices or retaining devices can be fastened, for example. By means of this design as a slot or guide/rail, the release devices or retaining devices may be fastened in various ways in the longitudinal direction of the slots or guides/rails, i.e. in the longitudinal direction of the pod 1 in the embodiments shown in this case. A detailed view of the receiving device 41 is shown in FIGS. 3a and 3b. In the embodiments shown, the pod 1 additionally comprises maintenance openings 13 in the side walls in the region of the load region 4. The maintenance openings 13 for example provide access to the retaining device or release device in the receiving device 41.

Figure 2:
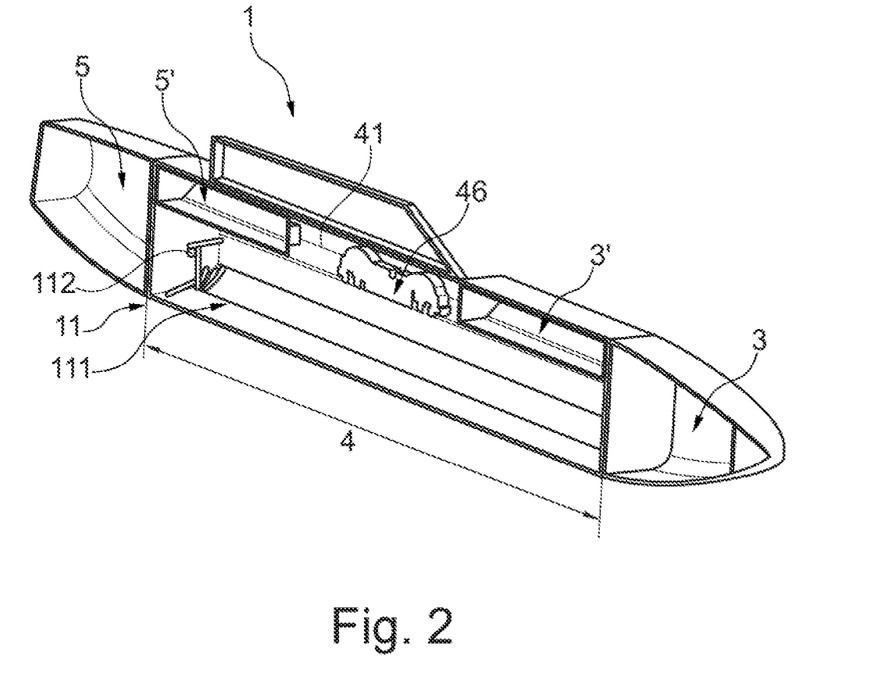
FIG. 2 is a sectional view of a further embodiment of the multifunctional pod.

FIG. 2 is a sectional view of a further embodiment of the multifunctional pod 1. The pod 1 comprises a first tank region 3 in the front region of the pod 1—what is known as a fore tank. In addition, the pod 1 comprises another tank region 5 in the rear region of the pod 1—what is known as an aft tank. The first tank region 3 is connected to an additional tank region 3' which is on the side of the central region 4 of the pod 1 facing the aircraft. Likewise, the additional tank region 5 is connected to an additional tank region 5' which is on the side of the central region 4 of the pod 1 facing the aircraft. The receiving device 41 for receiving retaining devices or release devices 46 is arranged between the two additional tank regions 3' and 5' on the side of the central region 4 of the pod 1 facing the aircraft. The loading opening 11 of the load region 4 can be closed by a closure device 11. In the embodiment shown, the closure device 11 consists of a closure mechanism 112 and a closure flap 111. In order to load the load region 4, the closure flap 111 can be opened and the additional load 42 (not shown) can be fastened to the retaining device or release device 46. Various exemplary configurations of the process of loading the load region 4 are shown in FIGS. 4 to 7.

FIGS. 3a and 3b show different embodiments of the positioning of release devices 46. Here, FIG. 3a shows a first configuration of the arrangement of a release device 46 in the receiving device 41 of the pod 1. In the embodiment of the pod 1 shown, the receiving device 41 comprises three slots, in which release devices 46 or retaining devices (not shown) can be fastened. By means of this design as a slot or guide/rail, longitudinally with respect to the extension direction of the pod 1, release devices 46 or retaining devices can be arranged in various ways. In the position of the release device 46 shown in FIG. 3a, an additional load (not shown) can be fastened to the release device 46, for example. In the position of the release devices 46 shown in FIG. 3b, two additional loads (not shown) can be releasably fastened side by side to the release devices 46, for example. If there is for example the need to fasten a load to the release device 46 that is larger in terms of dimensions, the embodiment shown in FIG. 3a is advantageous. When fastening two smaller loads thereto, the embodiment shown in FIG. 3b is advantageous, for example. Here, two smaller loads can be fastened side by side. The positions of the release devices 46 shown in FIGS. 3a and 3b can be combined with one another in any way. As a result, as required, a centrally arranged release device 46 and two release devices 46 arranged side by side can be arranged in succession in the receiving device 41, for example. Here, the option of combinations is only dependent on the number of slots and the width of the pod 1, and on the length of the load region 4 of the pod 1.

Figure 4A:
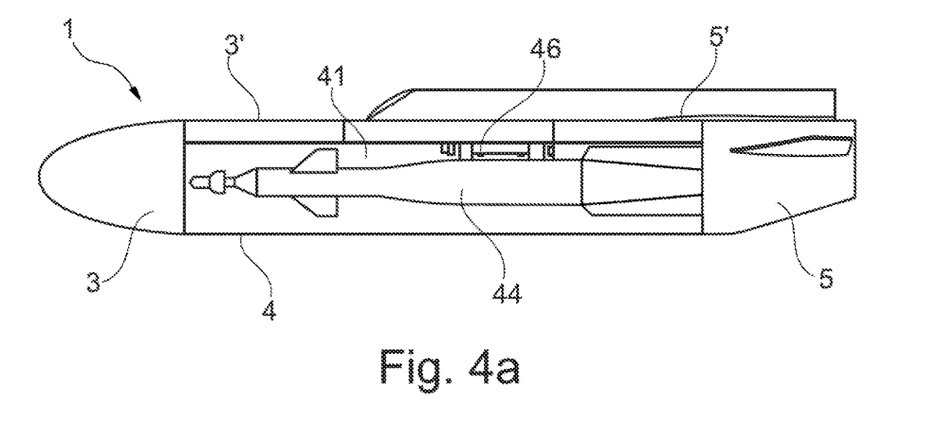
FIGS. 4a and 4b are different views of an embodiment of the multifunctional pod comprising a rocket.
Figure 4B:
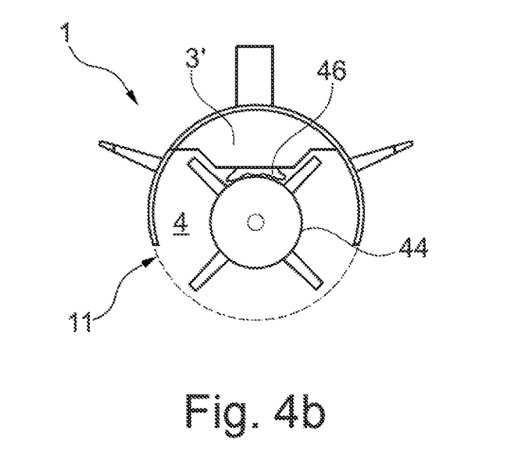

FIGS. 4a and 4b are different views of an embodiment of the multifunctional pod 1 comprising a rocket 44. Here, FIG. 4a is a sectional side view of the multifunctional pod 1. FIG. 4b is a sectional view of the multifunctional pod 1 from FIG. 4a, transversely to the longitudinal axis of the pod 1.

In the embodiment shown, the multifunctional pod 1 comprises a release device 46 comprising a rocket 44 in the additional region 4 of the pod 1 as an additional load 42. In the embodiment shown, the rocket 44 is releasably fastened to a release device 46. The release device 46 is attached to the receiving device 41 of the pod 1. In FIG. 4b, the receiving device 41 is covered by the tank region 3'. Signals can for example be transmitted from the aircraft to the release device 46 or to the rocket 44 itself, or in the opposite direction from the release device 46 or the rocket 44 to the aircraft, by means of a wireless or wired signal connection (not shown).

Figure 5A:
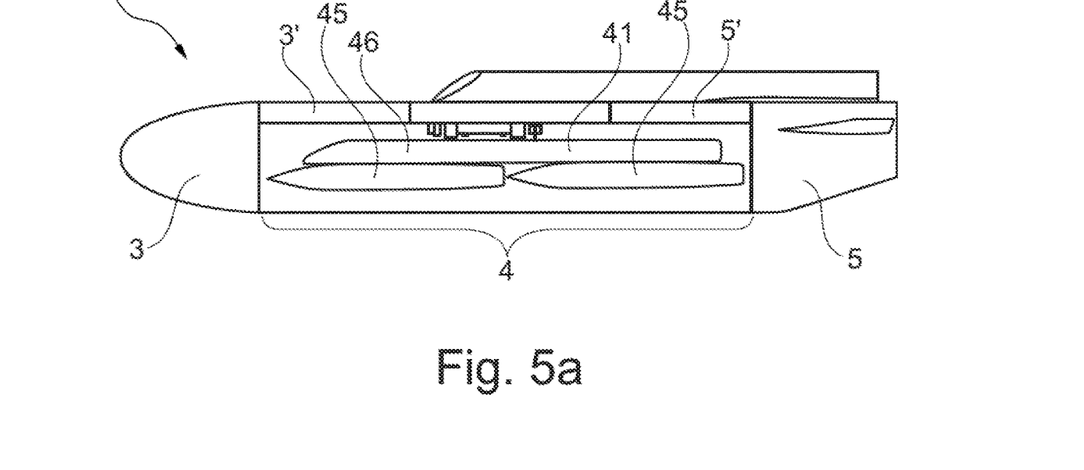
FIGS. 5a and 5b show different views of an embodiment of the multifunctional pod comprising a plurality of bombs.
Figure 5B:
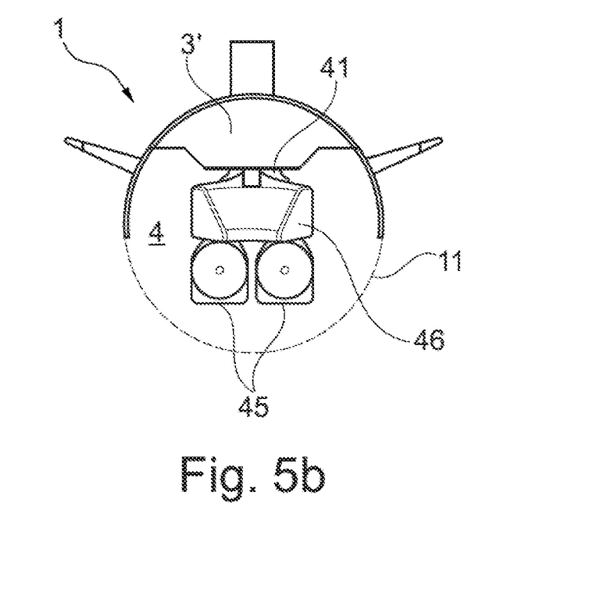

FIGS. 5a and 5b show different views of an embodiment of the multifunctional pod 1 comprising a plurality of bombs 45. Here, FIG. 5a is a sectional side view of the multifunctional pod 1. FIG. 5b is a sectional view of the multifunctional pod 1 from FIG. 5a, transversely to the longitudinal axis of the pod 1.

In the embodiment shown, the multifunctional pod 1 comprises a release device 46 comprising a plurality of bombs 45 as an additional load 42 in the additional region 4 of the pod 1. In the embodiment shown, the bombs 45 are releasably fastened to a shared release device 46 for four bombs 45. In the embodiment shown, the shared release device 46 has four positions at which bombs 45 can be fastened. The shared release device 46 is attached to the receiving device 41 of the pod 1. In FIG. 5b, the receiving device 41 is covered by the tank region 3' of the pod 1. Signals can for example be transmitted from the aircraft to the release device 46 or to the bomb 45 itself, or in the opposite direction from the release device 46 or the bomb 45 to the aircraft, by means of a wireless or wired signal connection (not shown). Although only four bombs 45 that are releasably attached to the release device are shown in the embodiment shown, depending on the size of the load region 4 and/or depending on the size of the bombs and/or rockets attached, said bombs and/or rockets can be accommodated in the load region 4 of the pod 1 in a different combination or quantity.

Figure 6A:
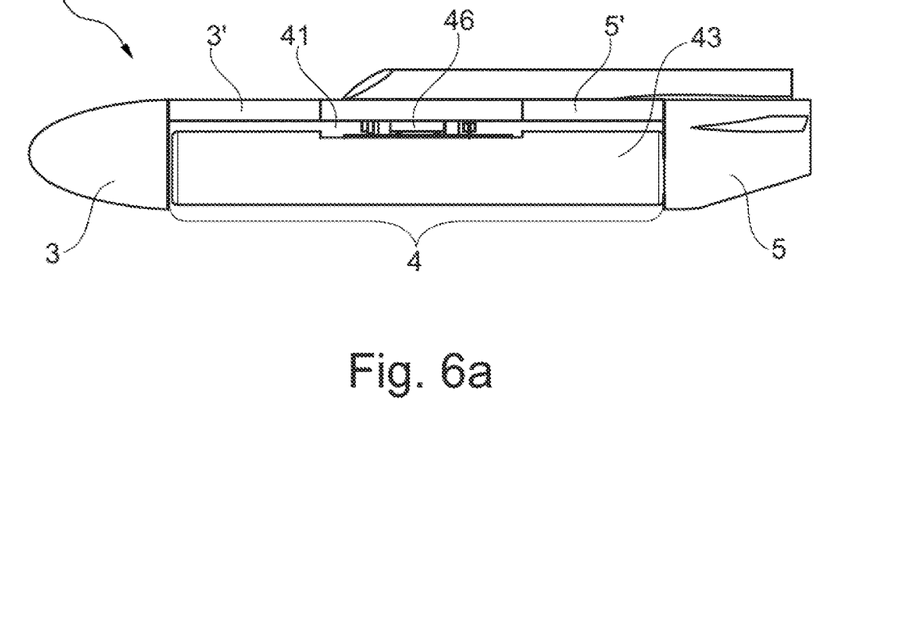
FIGS. 6a and 6b show different views of an embodiment of the multifunctional pod comprising a tank container as an additional load.
Figure 6B:
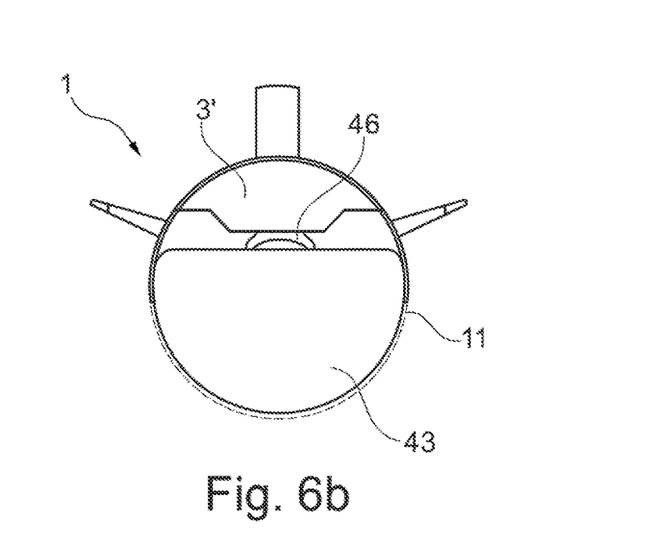

FIGS. 6a and 6b show different views of an embodiment of the multifunctional pod comprising a tank container 43 as an additional load 42. Here, FIG. 6a is a sectional side view of the multifunctional pod 1. FIG. 6b is a sectional view of the multifunctional pod 1 from FIG. 6a, transversely to the longitudinal axis of the pod 1.

In the embodiment shown, the multifunctional pod 1 comprises a tank container 43 as an additional load 42 in the additional region 4 of the pod 1. The tank container 43 is fastened to the receiving device 41 of the pod 1 by means of a retaining device 46. In FIG. 6b, the receiving device 41 is covered by the tank region 3' of the pod 1. In order to convey fuel from the tank container 43 to the aircraft, the retaining device 46 comprises an adapter (not shown). The adapter for example comprises a sealed connector for the fuel line, at which a connection to the fuel container 43 can be established, in order to provide the fuel connection between the fuel container 43 and the retaining device 46 and further to the aircraft. In order to convey the fuel from the tank container 43 to the aircraft, the aircraft may for example comprise a corresponding fuel pump. Alternatively, the tank container 43 may also be provided with a fuel pump which pumps the fuel from the container 43 to the aircraft. For load compensation of the entire aircraft, it may however be advantageous for it to be possible to internally and externally transfer fuel between the available tank containers by pumping, such as the tank container 43, the first tank region 3 and the second tank region 5. For example, fuel may also be transferred by pumping from the aircraft's own tank or the internal tank to the tank region 3, 5 of the pod 1 or to the tank container 43, or vice versa, for load compensation.

Figure 7A:
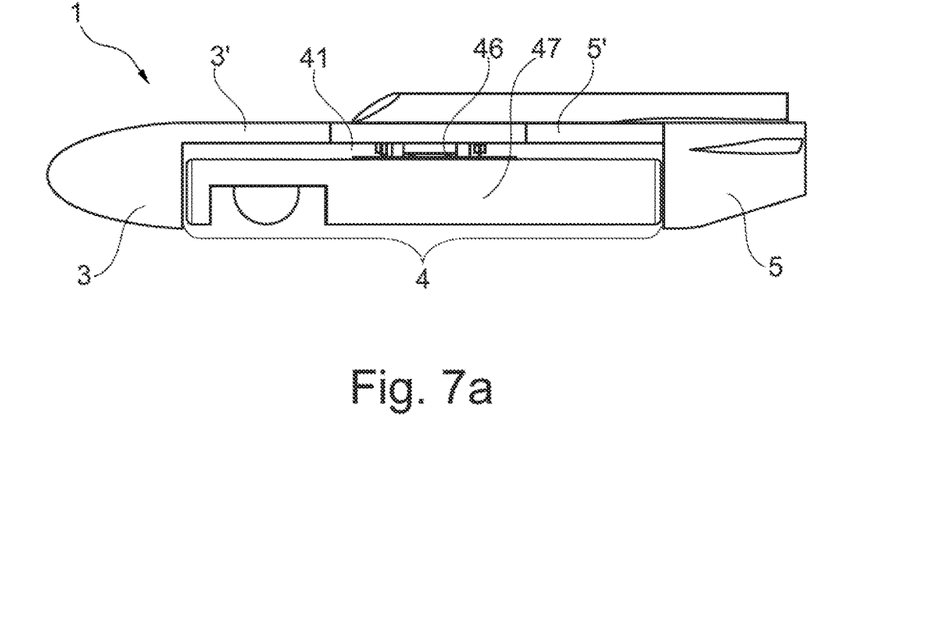
FIGS. 7a and 7b show different views of an embodiment of the multifunctional pod comprising a sensor device as an additional load.
Figure 7B:
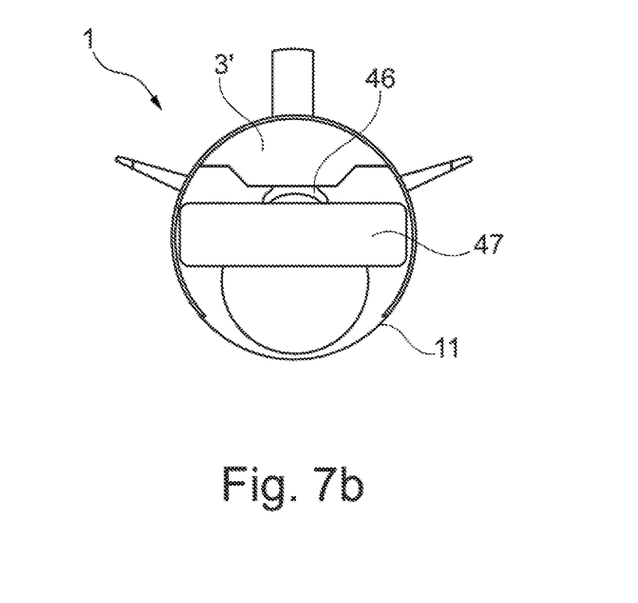

FIGS. 7a and 7b show different views of an embodiment of the multifunctional pod 1 comprising a sensor device 47 as an additional load. Here, FIG. 7a is a sectional side view of the multifunctional pod 1. FIG. 7b is a sectional view of the multifunctional pod 1 from FIG. 7a, transversely to the longitudinal axis of the pod 1.

In the embodiment shown, the multifunctional pod 1 comprises a sensor device 47 as an additional load 42 in the additional region 4 of the pod 1. In the embodiment shown, the sensor device 47 consists of a container which for example comprises a surveillance camera and electronic components for the recording and control of the surveillance camera, and for the sensor device 47 to communicate with an aircraft or a base station. The sensor device 47 is fastened to the receiving device 41 of the pod 1 by means of a retaining device 46. In FIG. 7b, the receiving device 41 is covered by the tank region 3' of the pod 1. The retaining device 46 is for example rigidly connected to the sensor device 47. The retaining device 46 may for example be locked in place in the receiving device 41 in order to receive the sensor device 47 in the load region 4 of the pod 1. Signals can be transmitted from the sensor device 47 to the aircraft or from the aircraft to the sensor device 47 by means of an adapter (not shown), for example. The signals may for example be transmitted from the sensor device 47 to the adapter and from the adapter to the aircraft, or from the aircraft to the sensor device 47, in a wired and/or wireless manner.

Although the invention has been primarily disclosed and described with reference to certain embodiments, it should be understood by those familiar with the field of expertise that numerous modifications in terms of the design and details can be made thereto without departing from the central concept and scope of the invention as specified in the accompanying claims. The scope of the invention is thus determined by the accompanying claims, and it is therefore intended that this includes all the modifications that are covered by the literal meaning or the scope of equivalence of the claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. Aircraft having a multifunctional pod which is releasably fastenable to the aircraft, comprising:
   at least two separate regions;
   at least one first region of the at least two separate regions being provided for receiving fuel, wherein the first region for receiving fuel is arranged in a front region of the pod; and
   at least one second region of the at least two separate regions comprising at least one receiving device for releasably attaching at least one additional load,
   the additional load being configured to be releasably attachable to the at least one receiving device via a loading opening on the side of the pod facing away from the aircraft,
   wherein a third region for receiving fuel is arranged in the rear region of the pod,
   wherein the second region is arranged between the first region and the third region in a lengthwise direction of the pod, and wherein the multifunctional pod is releasable from the aircraft during flight, and
   wherein the at least one first region and the third region, on the side of the pod facing the aircraft, extend into the at least one second region at least in part.

2. The aircraft of claim 1, wherein the at least one receiving device is configured to have different types of loads releasably attached in the at least one second region thereto in various ways.

3. The aircraft of claim 1, wherein the additional load comprises at least one container for receiving fuel.

4. The aircraft of claim 3, wherein the receiving device comprises at least one adapter for transferring fuel from the container to the aircraft or for filling the container with fuel from the aircraft by means of an external refuelling device.

5. The aircraft of claim 1, wherein the additional load comprises at least one rocket or at least one bomb.

6. The aircraft of claim 5, wherein the receiving device comprises at least one release device for one or more rockets.

7. The aircraft of claim 5, wherein the receiving device comprises at least one release device for one or more bombs.

8. The aircraft of claim 6, wherein the receiving device comprises at least one adapter for controlling the release of the rockets by the aircraft.

9. The aircraft of claim 7, wherein the receiving device comprises at least one adapter for controlling the release of the bombs by the aircraft.

10. The aircraft of claim 5, wherein at least one of a plurality of rockets and bombs is releasably attached to the receiving device in parallel, or in succession, or in parallel and in succession.

11. The aircraft of claim 1, wherein the additional load comprises at least one sensor device.

12. The aircraft of claim 11, wherein the receiving device comprises at least one adapter for the aircraft to communicate with the at least one sensor device.

13. The aircraft of claim 1, further comprising: at least one closure device configured to close the loading opening.

* * * * *